(12) United States Patent
Oz et al.

(10) Patent No.: US 8,024,787 B2
(45) Date of Patent: Sep. 20, 2011

(54) PACKET FIREWALLS OF PARTICULAR USE IN PACKET SWITCHING DEVICES

(75) Inventors: Doron Oz, Even Yehuda (IL); Nir Ben-Dvora, Herzliya (IL); Eldad Bar Eli, Ramat Hasharon (IL)

(73) Assignee: Cisco Technology, Inc., San Jose, CA (US)

(*) Notice: Subject to any disclaimer, the term of this patent is extended or adjusted under 35 U.S.C. 154(b) by 0 days.

(21) Appl. No.: 11/416,297

(22) Filed: May 2, 2006

(65) Prior Publication Data
US 2007/0261110 A1 Nov. 8, 2007

(51) Int. Cl.
*G06F 9/455* (2006.01)

(52) U.S. Cl. .......................... 726/13; 726/11

(58) Field of Classification Search .................. None
See application file for complete search history.

(56) References Cited

U.S. PATENT DOCUMENTS

| | | | |
|---|---|---|---|
| 6,098,172 A * | 8/2000 | Coss et al. ............... | 726/11 |
| 6,219,706 B1 | 4/2001 | Fan et al. | |
| 6,505,254 B1 | 1/2003 | Johnson et al. | |
| 6,772,347 B1 * | 8/2004 | Xie et al. ................ | 726/11 |
| 6,854,063 B1 | 2/2005 | Qu et al. | |
| 7,000,248 B2 | 2/2006 | Mizukoshi | |
| 7,007,169 B2 | 2/2006 | Lingafelt et al. | |
| 7,093,283 B1 * | 8/2006 | Chen et al. .............. | 726/6 |
| 7,131,140 B1 | 10/2006 | O'Rourke et al. | |
| 7,188,363 B1 | 3/2007 | Boutros et al. | |
| 7,225,263 B1 | 5/2007 | Clymer et al. | |
| 7,308,716 B2 | 12/2007 | Danford et al. | |
| 7,318,097 B2 | 1/2008 | Bernoth | |
| 7,331,061 B1 * | 2/2008 | Ramsey et al. ............. | 726/23 |
| 7,370,353 B2 | 5/2008 | Yang | |
| 2001/0039593 A1 * | 11/2001 | Hariu ..................... | 709/249 |
| 2003/0093563 A1 * | 5/2003 | Young et al. ............. | 709/245 |
| 2004/0049701 A1 * | 3/2004 | Le Pennec et al. ........ | 713/201 |
| 2004/0088542 A1 * | 5/2004 | Daude et al. ............. | 713/156 |
| 2005/0081058 A1 * | 4/2005 | Chang et al. ............. | 713/201 |
| 2005/0114648 A1 | 5/2005 | Akundi et al. | |
| 2006/0005236 A1 * | 1/2006 | Wesinger et al. .......... | 726/11 |
| 2006/0059550 A1 | 3/2006 | Kausik | |
| 2006/0095579 A1 * | 5/2006 | Arregoces et al. ........ | 709/229 |
| 2006/0143699 A1 * | 6/2006 | Nagata et al. ............ | 726/11 |

* cited by examiner

Primary Examiner — David Pearson
(74) Attorney, Agent, or Firm — The Law Office of Kirk D. Williams

(57) ABSTRACT

One or more firewalls are used to perform firewall functionality on packets based on the entry and exit accesses of each of the one or more firewalls being applied to a packet. For example, when firewalls are included in a router, the interfaces of the router are typically mapped to virtual firewalls and access thereof. Based on the determined routing of a particular packet, the firewalls to apply and their corresponding entry and exit accesses are identified. In order to decouple the application by the firewall itself of the security policies from the network topology and routing architecture (e.g., the network routing address information which is typically relied upon by current firewalls), the firewall functionality is defined based on the identified entry and exit accesses of a firewall, rather than based on network defined addresses, for example.

32 Claims, 7 Drawing Sheets

MAPPING DATA STRUCTURE
320

| DEVICE INTERFACE (321) | MAPPED TO FIREWALL (323) | MAPPED TO FIREWALL ACCESS (325) |
|---|---|---|
| ETH0 | A | FINANCE |
| ETH1 | A | OUTSIDE |
| ETH2 | B | INSIDE |
| ETH5 | A | ENGINEERING |
| VIR3 | C | INSIDE |
| POS7 | A | OUTSIDE |
| ETH4 | A | DMZ |
| ETH7 | B | INSIDE |
| ⋮ | ⋮ | ⋮ |

FIGURE 3B

PACKET FIREWALLS OF PARTICULAR USE IN PACKET SWITCHING DEVICES

TECHNICAL FIELD

One embodiment of the invention relates to communications and computer systems, especially routers, packet switching systems, and other devices; and more particularly, one embodiment relates to packet firewalls of particular use in packet switching devices.

BACKGROUND

The communications industry is rapidly changing to adjust to emerging technologies and ever increasing customer demand. This customer demand for new applications and increased performance of existing applications is driving communications network and system providers to employ networks and systems having greater speed and capacity (e.g., greater bandwidth). In trying to achieve these goals, a common approach taken by many communications providers is to use packet switching technology. Increasingly, public and private communications networks are being built and expanded using various packet technologies, such as Internet Protocol (IP). Note, nothing described or referenced in this document is admitted as prior art to this application unless explicitly so stated.

Firewalls are currently used in networks to protect malicious and innocuous traffic from reaching different portions of the network. These firewalls can be standalone appliances or incorporated in packet switching devices (e.g., routers, switches, etc.). In either case, prior art systems may use physical and/or virtual firewalls. A physical firewall has physical interfaces on which packets are received and sent from and then the firewall functionality which acts on these packets. A virtual firewall has virtual interfaces (e.g., buffers, memory locations, other data structures) in which packets are available for processing by the firewall functionality. In other words, packets are virtually received when made available on the virtual interface, then processed by the firewall functionality, then virtually sent when forwarded or made available for processing by another part of the appliance (e.g., processed by a physical or virtual router). One way of looking at it is that a virtual firewall is an implementation/emulation of a physical firewall, much in the same manner that a computer system can emulate another one or more computer systems, or a router can emulate multiple routers—which is often referred to in the industry as multiple virtual routers. Additionally, just as multiple virtual routers can be implemented in a single router box, multiple virtual firewalls can be implemented in a single appliance.

For example, shown in FIG. 1 is a prior art conventional configuration of a network which includes a router with firewall 100 between a public Internet 110, a private enterprise network 120, and a publicly available portion 125 of the enterprise network. Firewall (100) prevents connections from being established between public Internet 110 and private enterprise network 120 that are initiated from public Internet 110, while allowing such connections if initiated from private enterprise network 120. Similarly, firewall (100) prevents connections from being established between publicly available portion 125 of the enterprise network and private enterprise network 120 that are initiated from publicly available portion 125 of the enterprise network, while allowing such connections if initiated from private enterprise network 120. Also, firewall 100 does not block connections between public Internet 110 and publicly available portion 125 of the enterprise network.

Current firewalls operate based on a knowledge of the topology of the network in which they are used in order to perform their functionality, and perform its functionality based on network addresses, such as, but not limited to, Internet Protocol (IP) and media access control (MAC) addresses. For example, in the configuration illustrated in FIG. 1, firewall router will receive and process routing information including routing updates in order to maintain its knowledge of the network topology. Thus, changes to the topology of the network require updates to the firewall, and the programming of the firewall functionality is based on a knowledge of these network addresses.

SUMMARY

Disclosed are, inter alia, methods, apparatus, data structures, computer-readable media, mechanisms, and means for implementing packet firewalls of particular use in packet switching devices. These packet firewalls may be virtual or physical devices, depending on the embodiment. For example, one embodiment includes multiple interfaces configured to receive and send packets; a firewall configured to perform firewall functionality on packets; and routing or switching or control functionality configured to control the processing and movement of packets between the interfaces and the firewall. The firewall is associated with multiple accesses, with each being mapped to an access. The firewall functionality applied to a particular packet is determined based on a particular entry access and a particular exit access, with these accesses being determined based on the routing of the particular packet between the interfaces.

BRIEF DESCRIPTION OF THE DRAWINGS

The appended claims set forth the features of the invention with particularity. The invention, together with its advantages, may be best understood from the following detailed description taken in conjunction with the accompanying drawings of which:

FIGS. 2A-C and 3A-E are block diagrams illustrating a few of an extensible number of different virtual firewall configurations that may be used in one embodiment.

DETAILED DESCRIPTION

Figure 1:
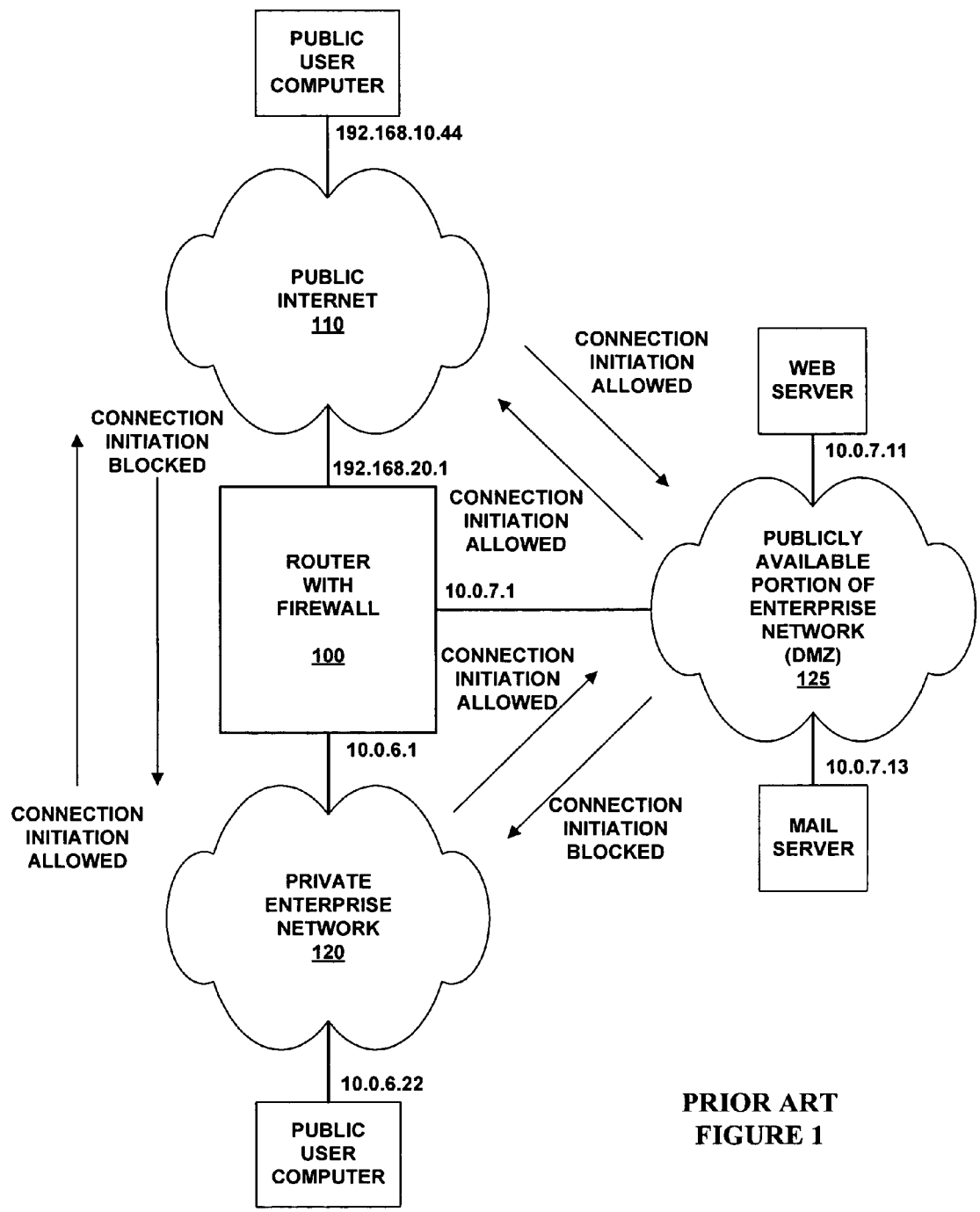
FIG. 1 is a block diagram of a prior art network configuration.

Disclosed are, inter alia, methods, apparatus, data structures, computer-readable media, mechanisms, and means for implementing firewalls of particular use in packet switching devices. One or more firewalls are used to perform firewall functionality on packets based on the entry and exit accesses of each of the one or more firewalls being applied to a packet. For example, when firewalls are included in a router, the interfaces of the router are typically mapped to virtual firewalls and access thereof. Based on the determined routing of a particular packet, the firewalls to apply and their corresponding entry and exit accesses are identified.

By disassociating network routing address information which is typically relied upon by current firewalls, the firewall functionality can be defined based on the identified entry and exit accesses of a firewall, rather than based on network defined addresses. Thus, a firewall might have "inside" and "outside" accesses, and allow connections to be created from the inside to the outside, but not vice versa. In another example configuration, a company may have "management," "engineering," "accounting," "inside," "outside," and "DMZ" accesses on a single firewall. The firewall could be programmed to allow connections to be created or blocked, traffic allowed or blocked, etc. based on the entry access and exit access of a firewall being applied to a particular packet (e.g., management is allowed to create connections to engineering, but not vice versa; all traffic from the outside is blocked to accounting, but management can access accounting, etc.). In this manner, the programming of the firewall protection can be performed without referencing network addresses (although a firewall may reference these), and therefore, is required to maintain current routing information. Rather, network reconfigurations are handled by changing the mappings between interfaces (and/or network addresses) and accesses of the firewalls, while the programming of the firewall functionality may stay the same (e.g., "engineering" traffic may be sent and received on a different interface, but the programming of the firewall functionality will not necessarily change if it refers to "engineering" traffic rather than the network addresses of such traffic.)

Note, embodiments described herein include various elements and limitations, with no one element or limitation contemplated as being a critical element or limitation. Each of the claims individually recites an aspect of the invention in its entirety. Moreover, some embodiments described may include, but are not limited to, inter alia, systems, networks, integrated circuit chips, embedded processors, ASICs, methods, and computer-readable media containing instructions. One or multiple systems, devices, components, etc. may comprise one or more embodiments, which may include some elements or limitations of a claim being performed by the same or different systems, devices, components, etc. The embodiments described hereinafter embody various aspects and configurations within the scope and spirit of the invention, with the figures illustrating exemplary and non-limiting configurations. Note, computer-readable media and means for performing methods and processing block operations are disclosed and are in keeping with the extensible scope and spirit of the invention.

As used herein, the term "packet" refers to packets of all types or any other units of information or data, including, but not limited to, fixed length cells and variable length packets, each of which may or may not be divisible into smaller packets or cells. The term "packet" as used herein also refers to both the packet itself or a packet indication, such as, but not limited to all or part of a packet or packet header, a data structure value, pointer or index, or any other part or direct or indirect identification of a packet or information associated therewith. For example, often times a router operates on one or more fields or data of a packet, especially the header, so the body of the packet is often stored in a separate memory while the packet header is manipulated, and based on the results of the processing of the packet (i.e., the packet header in this example), the entire packet is forwarded or dropped, etc. Additionally, these packets may contain one or more types of information, including, but not limited to, voice, data, video, and audio information. The term "item" is used generically herein to refer to a packet or any other unit or piece of information or data, a device, component, element, or any other entity. The phrases "processing a packet" and "packet processing" typically refer to performing some steps or actions based on the packet contents (e.g., packet header or other fields), and such steps or action may or may not include modifying, storing, dropping, and/or forwarding the packet and/or associated data. The term or reference to "dropping" a packet or a variant thereof (e.g., drop the packet, the packet is dropped, etc.) is used herein to identify the physical dropping of the packet, causing the packet to be dropped, and/or marking or distinguishing the packet for subsequent dropping or potentially different processing (e.g., a higher probability of being dropped by subsequent processing, Early Congestion Notification marking, etc.) than that of an "admitted" packet. The term "interface" of a networked device refers to a physical interface, a logical interface (e.g., a portion of a physical interface or sometimes referred to in industry as a sub-interface—for example, such as, but not limited to a particular VLAN associated with a network interface), and/or a virtual interface (e.g., traffic grouped together based on some characteristic—for example, such as, but not limited to, a tunnel interface).

The term "system" is used generically herein to describe any number of components, elements, sub-systems, devices, packet switch elements, packet switches, routers, networks, computer and/or communication devices or mechanisms, or combinations of components thereof. The term "computer" is used generically herein to describe any number of computers, including, but not limited to personal computers, embedded processing elements and systems, control logic, ASICs, chips, workstations, mainframes, etc. The term "processing element" is used generically herein to describe any type of processing mechanism or device, such as a processor, ASIC, field programmable gate array, computer, etc. The term "device" is used generically herein to describe any type of mechanism, including a computer or system or component thereof. The terms "task" and "process" are used generically herein to describe any type of running program, including, but not limited to a computer process, task, thread, executing application, operating system, user process, device driver, native code, machine or other language, etc., and can be interactive and/or non-interactive, executing locally and/or remotely, executing in foreground and/or background, executing in the user and/or operating system address spaces, a routine of a library and/or standalone application, and is not limited to any particular memory partitioning technique. The steps, connections, and processing of signals and information illustrated in the figures, including, but not limited to any block and flow diagrams and message sequence charts, may typically be performed in the same or in a different serial or parallel ordering and/or by different components and/or processes, threads, etc., and/or over different connections and be combined with other functions in other embodiments, unless this disables the embodiment or a sequence is explicitly or implicitly required (e.g., for a sequence of read the value, process the value—the value must be obtained prior to processing it, although some of the associated processing may be performed prior to, concurrently with, and/or after the read operation). Furthermore, the term "identify" is used generically to describe any manner or mechanism for directly or indirectly ascertaining something, which may include, but is not limited to receiving, retrieving from memory, determining, defining, calculating, generating, etc.

Moreover, the terms "network" and "communications mechanism" are used generically herein to describe one or more networks, communications media or communications systems, including, but not limited to the Internet, private or public telephone, cellular, wireless, satellite, cable, local area, metropolitan area and/or wide area networks, a cable, electrical connection, bus, etc., and internal communications mechanisms such as message passing, interprocess communications, shared memory, etc. The term "message" is used generically herein to describe a piece of information which may or may not be, but is typically communicated via one or more communication mechanisms of any type.

The term "storage mechanism" includes any type of memory, storage device or other mechanism for maintaining instructions or data in any format. "Computer-readable medium" is an extensible term including any memory, storage device, and/or other storage mechanism. The term "memory" includes any random access memory (RAM), read only memory (ROM), flash memory, integrated circuits, and/or other memory components or elements. The term "storage device" includes any solid state storage media, disk drives, diskettes, networked services, tape drives, and other storage devices. Memories and storage devices may store computer-executable instructions to be executed by a processing element and/or control logic, and data which is manipulated by a processing element and/or control logic. The term "data structure" is an extensible term referring to any data element, variable, data structure, database, and/or one or more organizational schemes that can be applied to data to facilitate interpreting the data or performing operations on it, such as, but not limited to memory locations or devices, sets, queues, trees, heaps, lists, linked lists, arrays, tables, pointers, etc. A data structure is typically maintained in a storage mechanism. The terms "pointer" and "link" are used generically herein to identify some mechanism for referencing or identifying another element, component, or other entity, and these may include, but are not limited to a reference to a memory or other storage mechanism or location therein, an index in a data structure, a value, etc.

The term "one embodiment" is used herein to reference a particular embodiment, wherein each reference to "one embodiment" may refer to a different embodiment, and the use of the term repeatedly herein in describing associated features, elements and/or limitations does not establish a cumulative set of associated features, elements and/or limitations that each and every embodiment must include, although an embodiment typically may include all these features, elements and/or limitations. In addition, the phrase "means for xxx" typically includes computer-readable medium containing computer-executable instructions for performing xxx.

In addition, the terms "first," "second," etc. are typically used herein to denote different units (e.g., a first element, a second element). The use of these terms herein does not necessarily connote an ordering such as one unit or event occurring or coming before another, but rather provides a mechanism to distinguish between particular units. Additionally, the use of a singular tense of a noun is non-limiting, with its use typically including one or more of the particular thing rather than just one (e.g., the use of the word "memory" typically refers to one or more memories without having to specify "memory or memories," or "one or more memories" or "at least one memory", etc.). Moreover, the phrases "based on x" and "in response to x" are used to indicate a minimum set of items "x" from which something is derived or caused, wherein "x" is extensible and does not necessarily describe a complete list of items on which the operation is performed, etc. Additionally, the phrase "coupled to" is used to indicate some level of direct or indirect connection between two elements or devices, with the coupling device or devices modifying or not modifying the coupled signal or communicated information. The term "subset" is used to indicate a group of all or less than all of the elements of a set. The term "subtree" is used to indicate all or less than all of a tree. Moreover, the term "or" is used herein to identify a selection of one or more, including all, of the conjunctive items. Additionally, the transitional term "comprising," which is synonymous with "including," "containing," or "characterized by," is inclusive or open-ended and does not exclude additional, unrecited elements or method steps.

One or more firewalls are used to perform firewall functionality on packets based on the entry and exit accesses of each of the one or more firewalls being applied to a packet. For example, when firewalls are included in a router, the interfaces of the router are typically mapped to virtual firewalls and access thereof. Based on the determined routing of a particular packet, the firewalls to apply and their corresponding entry and exit accesses are identified. In order to decouple the application by the firewall itself of the security policies from the network topology and routing architecture (e.g., the network routing address information which is typically relied upon by current firewalls), the firewall functionality is defined based on the identified entry and exit accesses of a firewall, rather than based on network defined addresses, for example.

One embodiment for processing packets includes: multiple interfaces configured to receive and send packets; a firewall configured to perform firewall functionality on packets; and routing or switching or control functionality configured to control the processing and movement of packets between the plurality of interfaces and the firewall. The firewall is associated with multiple accesses, with each interface being mapped to an access. The firewall functionality performed on a particular packet is determined based on a particular entry access and a particular exit access of the firewall being applied to the particular packet, as well as the programming of the firewall for those entry and exit accesses.

In one embodiment, the firewall is a virtual firewall. In one embodiment, each of the interfaces is a physical interface. In one embodiment, the particular entry access and the particular exit access are determined based on one or more lookup operations in one or more mapping data structures maintaining mappings between the accesses of the firewall and the interfaces. In one embodiment, the programming of the firewall does not include references to the plurality of interfaces or Internet Protocol (IP) or media access control (MAC) addresses associated with the plurality of interfaces. In one embodiment, the firewall includes at least three accesses, and the programming of the firewall references these at least three accesses. In one embodiment, at least two of the interfaces are mapped to a single one of the accesses of the firewall. In one embodiment, the particular entry access and the particular exit access are determined based on one or more lookup operations in one or more mapping data structures maintaining mappings between the accesses of the firewall and the interfaces. In one embodiment, the one or more mapping data structures includes a default access mapping specifying an access to be used as default for the firewall. In one embodiment, the processing of the packets includes determining the particular entry access and the particular exit access based on one or more lookup operations in one or more mapping data structures maintaining mappings between the accesses of the firewall and the interfaces.

One embodiment for processing packets includes: multiple interfaces configured to receive and send packets; multiple firewalls with each configured to perform firewall functionality on packets, with each of the firewalls including multiple accesses, with each of the interfaces being mapped to one of the firewalls and an access associated therewith (i.e., multiple interfaces can be mapped to a same or a different access on a same or different firewall as another interface); wherein the performance of the firewall functionality performed on a particular packet is determined based on a particular firewall, an entry access and an exit access of the particular firewall being applied to the particular packet, and programming of the particular firewall referencing the entry access and the exit access; and routing or switching or control functionality configured to control the processing and movement of packets between the interfaces and the firewalls.

In one embodiment, each of the firewalls is a virtual firewall. One embodiment is configured to successively apply two of the firewalls to a particular packet. In one embodiment, at least two of the firewalls are controlled by separate and independent management entities. In one embodiment, each of the plurality of interfaces is a physical interface. In one embodiment, the programming of the firewalls does not include references to the plurality of interfaces or Internet Protocol (IP) or media access control (MAC) addresses associated with the interfaces. In one embodiment, the particular firewall and its entry and exit accesses for the particular packet are determined based on one or more lookup operations in one or more mapping data structures maintaining mappings between the interfaces and the firewalls and their accesses. In one embodiment, the mapping data structures includes a default access mapping specifying an access to be used as default for at least one of the firewalls. In one embodiment, the particular firewall includes at least three accesses, and the programming of the particular firewall references these at least three accesses. In one embodiment, at least two of the interfaces are mapped to a single one of the accesses on a single one of the firewalls.

One embodiment for processing packets includes: multiple interfaces configured to receive and send packets; multiple virtual firewalls with each configured to perform firewall functionality on packets, each of the virtual firewalls including multiple accesses, with each of the interfaces being mapped to one of the virtual firewalls and an access associated therewith; wherein the performance of the firewall functionality performed on a particular packet is determined based on one or more of the virtual firewalls applied to the particular packet, and the firewall functionality applied by each particular virtual firewall of the one or more of the virtual firewalls applied to the particular packet is determined based on the corresponding entry access and exit access of the particular virtual firewall corresponding to the particular packet, and programming of the particular virtual firewall referencing the entry access and the exit access; and routing or switching or control functionality configured to determine and control the processing and movement of the packets between the interfaces and the virtual firewalls, wherein the determination for the particular packet includes performing one or more lookup operations in one or more mapping data structures maintaining mappings between the interfaces and the accesses of virtual firewalls to identify the one or more of the virtual firewalls and their entry and exit access thereof.

In one embodiment, the programming of the virtual firewalls do not include references to the plurality of interfaces or Internet Protocol (IP) or media access control (MAC) addresses associated with the plurality of interfaces. In one embodiment, at least one of the virtual firewalls includes at least three accesses with its programming referencing said at least three accesses. In one embodiment, at least two of the interfaces are mapped to a single one of said accesses on a single one of said virtual firewalls of said virtual firewalls. In one embodiment, the one or more mapping data structures includes a default access mapping specifying an access of to be used as default for the firewall.

One embodiment includes a packet switching device comprising: a plurality of interfaces and a plurality of accesses on each of a plurality of virtual firewalls. The packet switching device: in response to an identification of a particular packet and an associated particular source interface of the plurality of interfaces and an associated particular destination interface of the plurality of interfaces, determines a particular virtual firewall of said virtual firewalls on which to apply to the particular packet, an entry access of the particular virtual firewall corresponding the particular source interface, and an exit access of the particular virtual firewall corresponding the particular destination interface; and applies the particular virtual firewall to the particular packet based on the entry access and the exit access to determine how to manipulate the particular packet; and performs said manipulation on the particular packet.

In one embodiment, said manipulation includes modification, dropping or forwarding of the particular packet. In one embodiment, the packet switching device includes one or more data structures defining mappings between each of the plurality of interfaces and said accesses of said virtual firewalls; and wherein said determining the particular virtual firewall, the entry access and the exit access includes performing one or more lookup operations on said data structures. In one embodiment, each of said virtual firewalls do not include packet routing functionality.

One embodiment includes a packet switching device comprising: a plurality of interfaces and a plurality of accesses on each of a plurality of virtual firewalls. The packet switching device: in response to an identification of a particular packet and an associated particular source interface of the plurality of interfaces and an associated particular destination interface of the plurality of interfaces, determines a first particular virtual firewall of said virtual firewalls on which to apply to the particular packet, a first entry access of the particular virtual firewall corresponding the particular source interface and an first exit access of the first particular firewall, and determines a second particular virtual firewall of said virtual firewalls on which to apply to the particular packet, a second entry access of the second particular virtual firewall and a second exit access of the second particular virtual firewall corresponding the particular destination interface; and successively applies to the particular packet in order to determine how to manipulate the particular packet: the first particular virtual firewall based on the first entry and exit accesses and then the second particular virtual firewall based on the second entry and exit accesses; and performs the manipulation on the particular packet.

One embodiment for performing firewall protection, includes: means for identifying for the packet received on a first interface with a second interface identified as being a destination of the packet after applying a virtual firewall to the packet: a particular virtual firewall, an entry access of the particular virtual firewall, and an exit access of the particular virtual firewall; and means for applying the virtual firewall to the particular packet based on the entry access and the exit access to determine how to manipulate the particular packet.

One embodiment includes one or more data structures defining mappings between the first and the second interfaces and said entry and exit accesses of the particular virtual firewall; and wherein said means for identifying includes a lookup mechanism configured to perform lookup operations on said data structures. In one embodiment, the virtual firewall includes a third access in addition to the first and second accesses; and wherein said one or more data structures maps an interface to the third access.

Figure 2A:
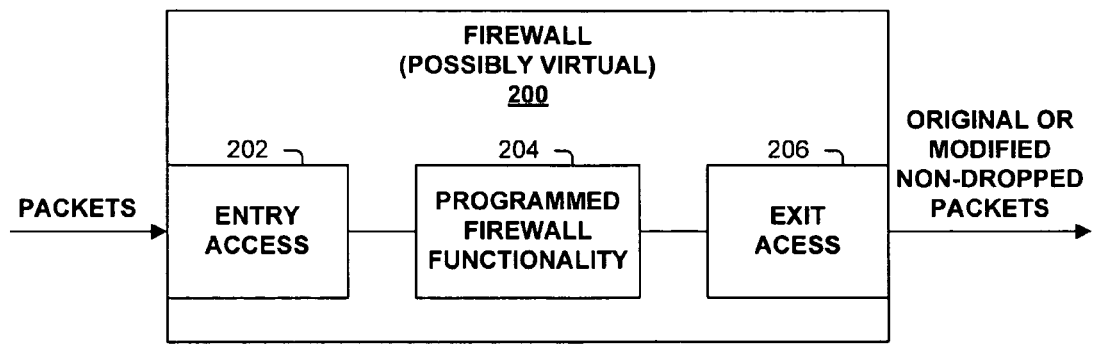

Turning to the figures, FIG. 2A illustrates a logical view of a firewall 200 used in one embodiment. As shown, firewall 200 includes an entry access 202 (i.e., the input point of the firewall for the packet), programmed firewall functionality 204, and an exit access 206 (i.e., the output point of the firewall for the packet). These entry and exit accesses (202, 206) may be "virtual" in that they do not have to physically exist, rather they can be designations associated with packets and based on which the programmed firewall functionality (204) is applied to the packets, or in other words, firewall 200 is applied to the packets. Any action that a standard firewall can perform can typically be performed by a firewall described herein. Such actions typically include blocking or allowing connections, forwarding/moving/passing of the packet (which may include actual physical movement of the packet or virtual forwarding such as merely allowing the packet to be forwarded by another mechanism), modifying and/or dropping a packet.

Note, the firewalls described herein can be virtual or physical firewalls, with a virtual firewall emulating a physical firewall but not having the physical interfaces of a standard standalone firewall. In order to denote this, FIGS. 2A-2C include the description of "possibly virtual".

Figure 2B:
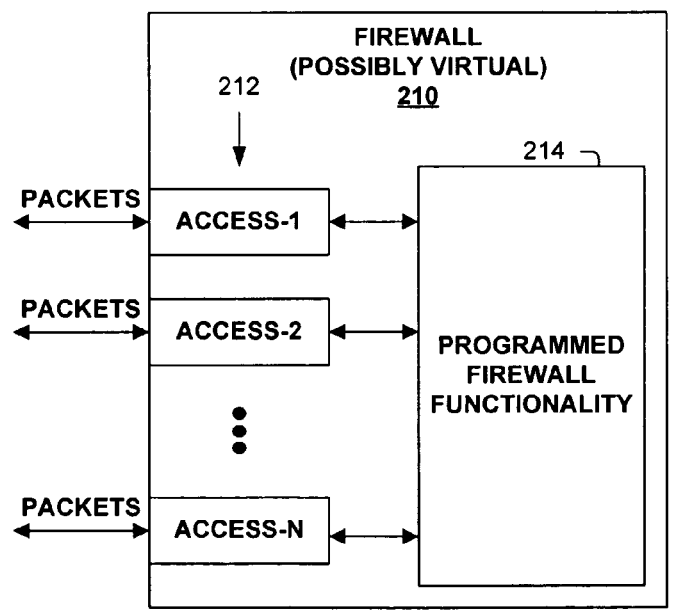

FIG. 2B shows another firewall 210, which explicitly illustrates that a firewall can physically or logically have more than two accesses 212, based on which two accesses correspond to a particular packet, programmed firewall functionality 214 is applied to the particular packet. Also, note, that multiple firewalls can be successively applied to a packet. For example, if the interface on which a packet is received is mapped to a first firewall and it is determined that the packet should be sent out a second interface which corresponds to a second firewall, the packet will be subjected to both the first and second firewalls (assuming that it is not dropped after the first firewall is applied to it).

Figure 2C:
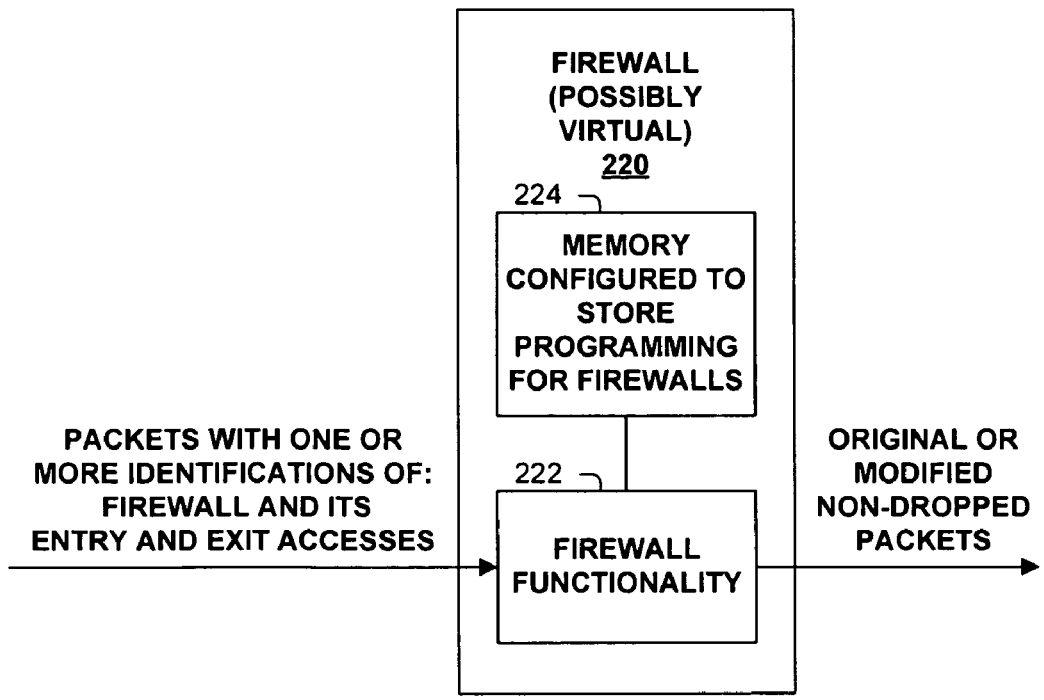

FIG. 2C illustrates another firewall 220, which includes firewall functionality 222 and one or memory (or other storage) devices 224 configured to store programming for each of one or more firewalls. Typically, a received packet includes indications of a firewall (if more than one is available), an entry access and an exit access. In one embodiment, these indications are generated by the routing, switching or control functionality of the embodiment. Based on firewall programming stored in memory 224 corresponding to the received indications for the packet, the firewall functionality is applied to the received packet by firewall functionality 222.

Figure 3A:
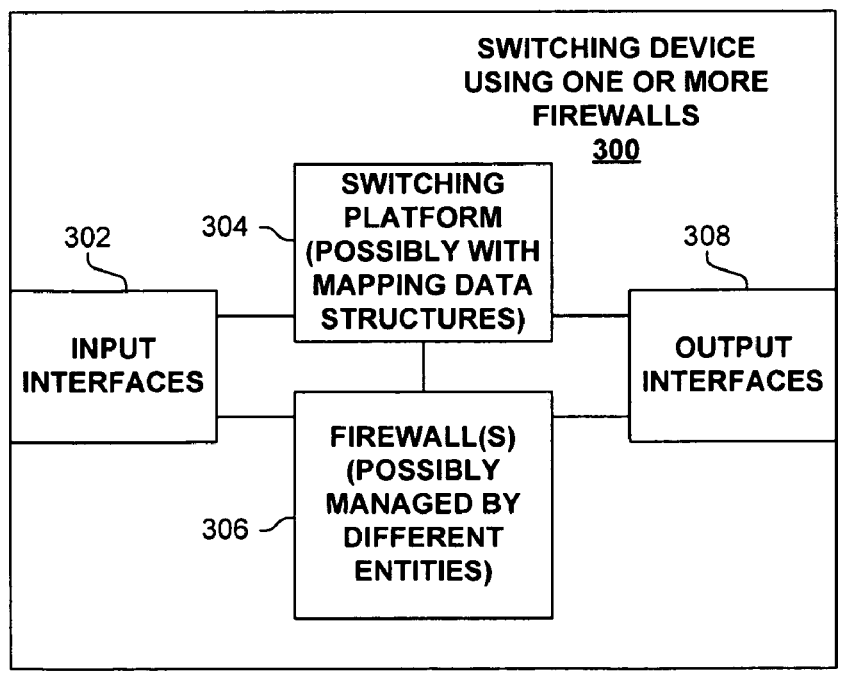

FIG. 3A illustrates a switching device 300 using one or more firewalls. As shown, switching device 300 includes input interfaces 302, output interfaces 308, a switching platform 304 which may include data structures for mapping interfaces 302, 308 to firewalls 306 and their entry and exit accesses. Note, interfaces 302 and 308 may be physical interfaces and/or virtual interfaces. When there are multiple firewalls 306 such as provided by a service provider to multiple customers, different firewalls 306 may be controlled by different management entities.

FIG. 3B illustrates a mapping data structure 320 used in one embodiment to map device interfaces 321 to firewalls 323 and accesses 325 thereof. For example and as shown, interface ETH0 is mapped to "FINANCE" access of firewall "A"; ETH1 is mapped to "OUTSIDE" access of firewall "A"; virtual interface VIR3 of the device is mapped to "INSIDE" access of firewall "C".

Figure 3C:
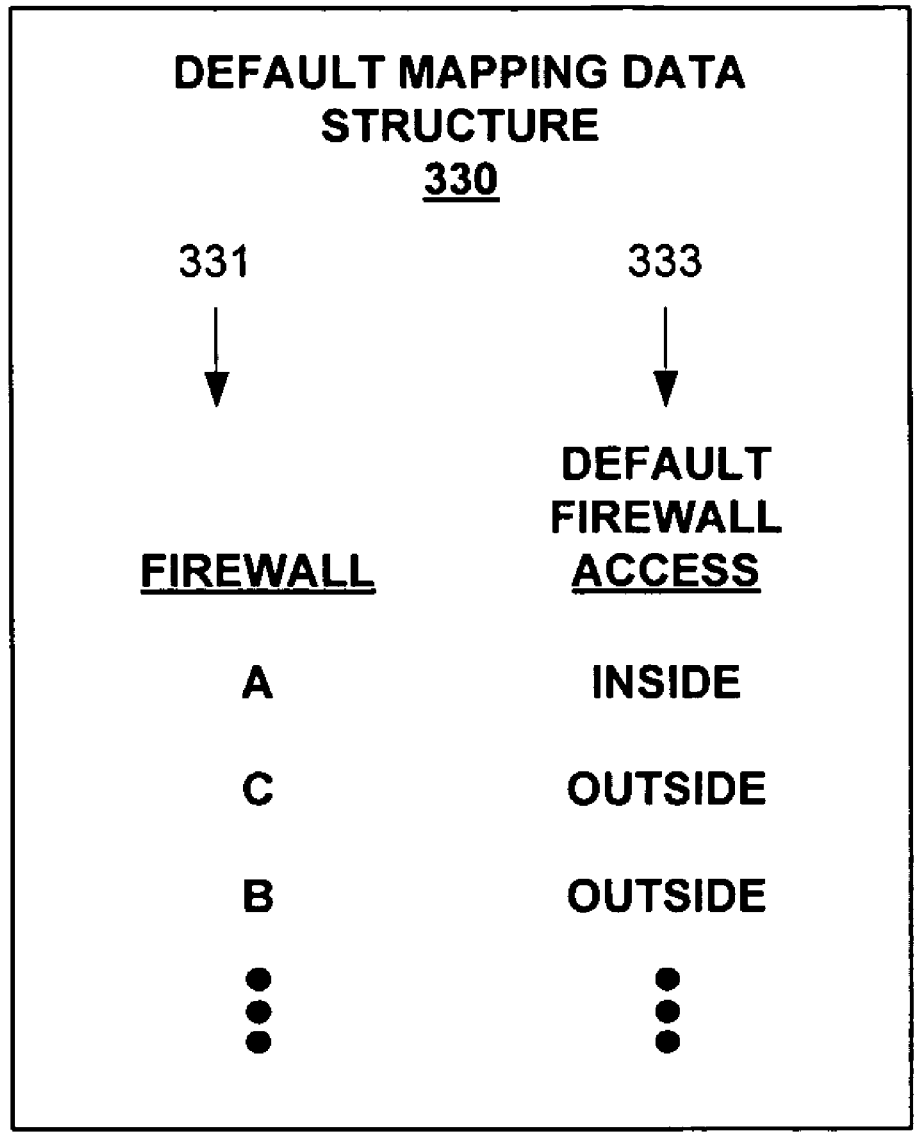

One embodiment provides, as shown in FIG. 3C, a programmable mechanism for establishing a default access 333 to use for a corresponding firewall 331 (e.g., the default access is used when an actual interface is not specified). Note, although not required, an interface 321 in mapping data structure 320 may be specified to be mapped to the same access as identified by default access 333 in default mapping data structure 330 (FIG. 3C). In one embodiment, default mapping data structure 330 is an especially useful tool when a device has a large number of interfaces, and thus, an entry in mapping data structure 320 (FIG. 3B) is not required, for example, for each interface of the switching device. In one embodiment, default mapping data structure 330 is especially useful for determining an egress access of a firewall applied to a packet and the ingress access of a next firewall applied to the same packet.

These mapping data structures 320 (FIG. 3B) and 330 (FIG. 3C) can be used to identify which firewall and its corresponding accesses for each packet, whether the switching device is real or virtual and/or the firewall is real or virtual. Note, in one embodiment, the identified firewall for a packet operates on the packet based on the mapped accesses and is completely unaware of the actual and/or default real or virtual interfaces associated with the packet.

For example, for a particular packet received on ETH0 and is determined to be sent out ETH1, lookup operations on mapping data structure 320 identifies to map interface ETH0 to access "FINANCE" of virtual router "A" and to map interface ETH1 to access "OUTSIDE" of virtual router "A." Therefore, firewall "A" will be applied to the particular packet based on its entry access "FINANCE" and its exit access "OUTSIDE."

Note, default mapping data structure 330 is used in one embodiment to identify which accesses are used when multiple firewalls are successively applied to a packet. For example, if a packet is received on ETH0 (mapped to access "FINANCE" of firewall A in mapping data structure 320) and is determined (typically based on its destination address) to be sent out ETH7 (mapped to "INSIDE" access of firewall B in mapping data structure 320), then both firewalls A and B are to be applied to the packet. So, firewall A based on entry access "FINANCE" and exit access "INSIDE" (from default mapping data structure 330) will be first applied to the packet. Then, assuming the packet is not already dropped, firewall B based on entry access "OUTSIDE" (from default mapping data structure 330) and exit access "INSIDE" will be applied to the packet.

Figure 3D:
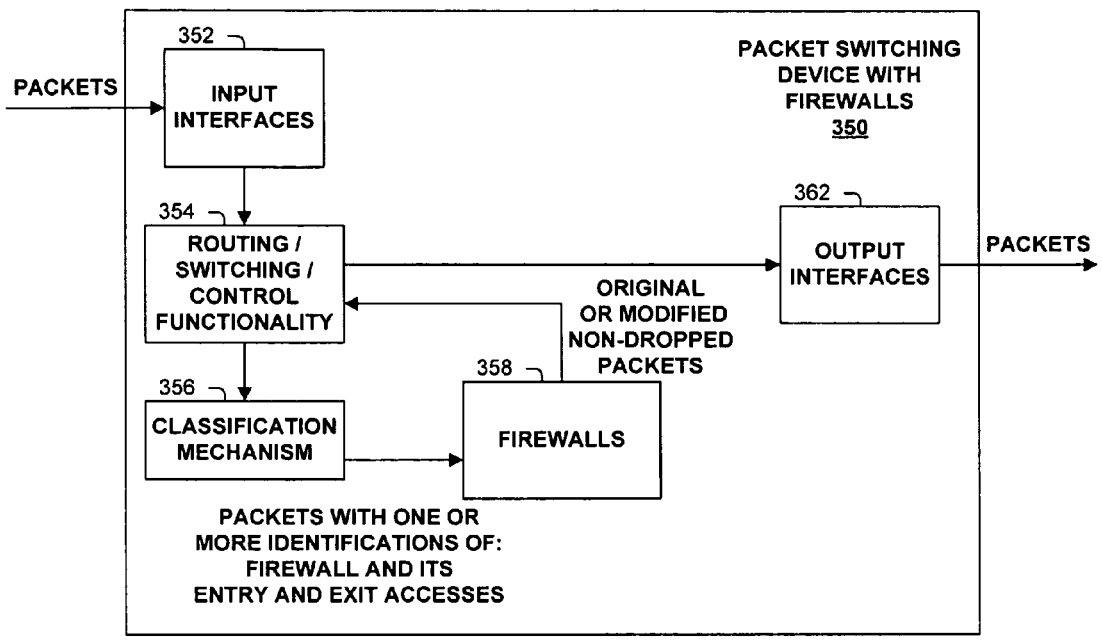

FIG. 3D illustrates a packet switching device 350 having multiple firewalls. As shown, a packet is received on one of the input interfaces 352. A forwarding lookup operation is performed by routing/switching/control functionality 354 to identify whether to forward the packet to an output interface of output interfaces 362, to a firewall of firewalls 358, to another (not shown) location (e.g., to a processor, to an application mechanism, etc.), or possibly to drop the packet. If the packet is to be processed by a firewall, the packet is first provided (e.g., made available to, physically moved to, etc.) to classification mechanism 356, which identifies the appropriate firewall of firewalls 358 and the entry and exit accesses thereof to use. In one embodiment, the firewall and/or accesses are identified by lookup operations on one or more data structures (e.g., data structures 320 of FIG. 3B and/or 330 of FIG. 3C) based on the interface on which the packet was received and an egress interface identified by the forwarding lookup operation. In one embodiment, a classification mechanism 356 is used which may determine the firewall and/or the entry and exit accesses thereof to use based on one or more fields of the packet (and possibly also on the corresponding input and output interfaces of the switching device), and/or any other classification of the packet. The determined firewall of firewalls (358) is applied to the packet. In one embodiment, the packet is returned to routing/switching/control functionality 354 to identify whether to forward the packet to an output interface of output interfaces 362, to a firewall of firewalls 358, to another (not shown) location (e.g., to a processor, to an application mechanism, etc.), or possibly to drop the packet.

In one embodiment, if routing/switching/control functionality 354 cannot identify an egress interface for a packet, the egress interface for the packet changes after processing by the firewall, or another anomaly condition is detected, then an exception condition has been identified, which may cause, for example, the packet to be dropped, routed to a software processes for further analysis, or some other exception condition processing performed.

Figure 3E:
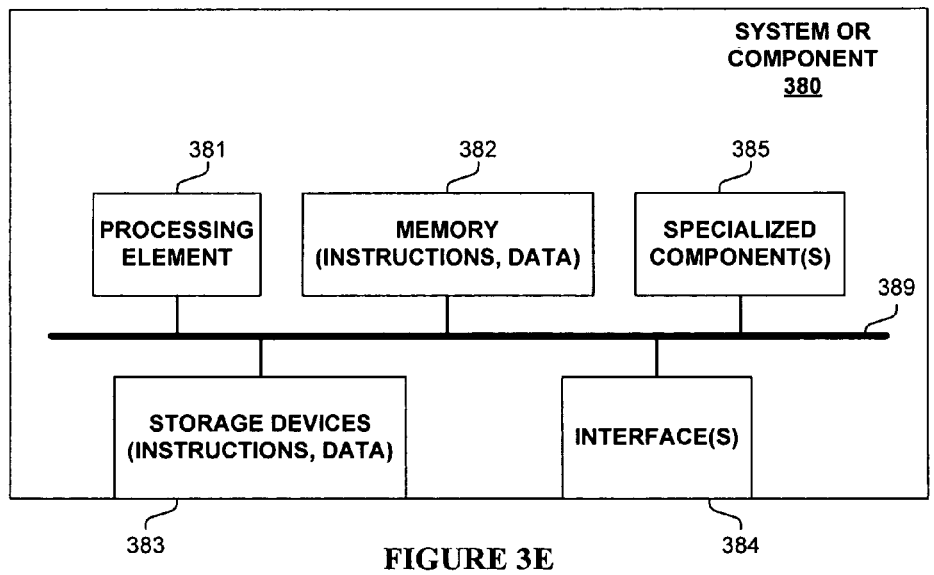

FIG. 3E is block diagram of a system or component 380 used in one embodiment of a firewall. In one embodiment, system or component 380 performs one or more processes corresponding to one of the flow diagrams illustrated or otherwise described herein.

In one embodiment, system or component 380 includes a processing element 381, memory 382, storage devices 383, an interface 384 for sending and receiving packets and/or communicating with external devices or components (e.g. classification or event detection mechanisms), and specialized components 385, which are typically communicatively coupled via one or more communications mechanisms 389, with the communications paths typically tailored to meet the needs of the application.

Various embodiments of component 380 may include more or less elements. The operation of component 380 is typically controlled by processing element 381 using memory 382 and storage devices 383 to perform one or more tasks or processes. Memory 382 is one type of computer-readable medium, and typically comprises random access memory (RAM), read only memory (ROM), flash memory, integrated circuits, and/or other memory components. Memory 382 typically stores computer-executable instructions to be executed by processing element 381 and/or data which is manipulated by processing element 381 for implementing functionality in accordance with an embodiment. Storage devices 383 are another type of computer-readable medium, and typically comprise solid state storage media, disk drives, diskettes, networked services, tape drives, and other storage devices. Storage devices 383 typically store computer-executable instructions to be executed by processing element 381 and/or data which is manipulated by processing element 381 for implementing functionality in accordance with an embodiment.

Figure 4:
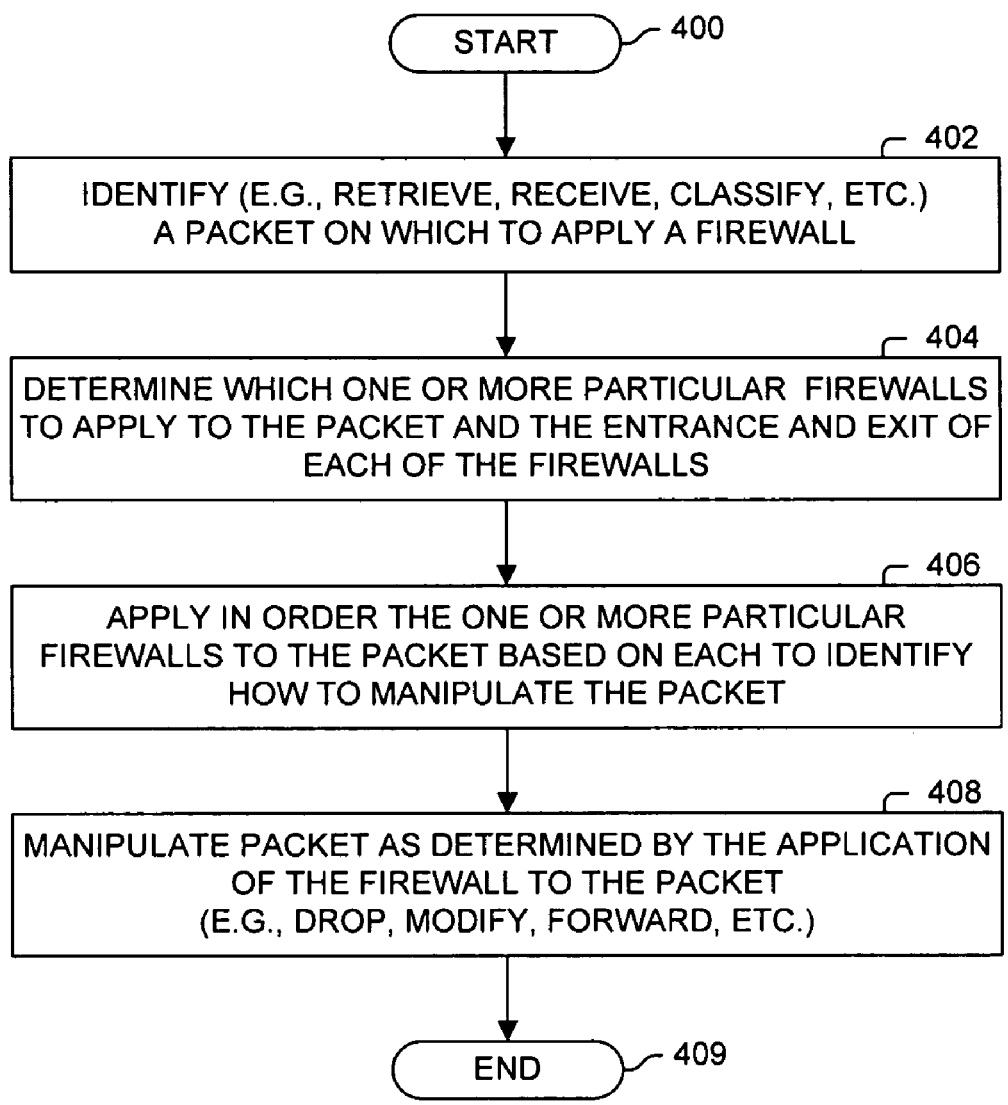
FIG. 4 is a flow diagram illustrating a process used in one embodiment in a device with a virtual firewall.

FIG. 4 illustrates a process used in one embodiment. Processing begins with process block 400, and proceeds to process block 402, wherein a packet on which to apply a firewall is identified (e.g., received, retrieved from a buffer, identified based on the result of a packet classification operations, etc.). In process block 404, the particular firewall(s) and the entry and exit accesses thereof to use are determined. In process block 406, the particular firewall(s) is/are applied to the packet based on their entry and exit accesses to determine how to manipulate the packet. In process block 408, the packet is correspondingly manipulated (e.g., dropped, forwarded, modified, etc.). Processing is complete as indicated by process block 409.

In view of the many possible embodiments to which the principles of our invention may be applied, it will be appreciated that the embodiments and aspects thereof described herein with respect to the drawings/figures are only illustrative and should not be taken as limiting the scope of the invention. For example, and as would be apparent to one skilled in the art, many of the process block operations can be re-ordered to be performed before, after, or substantially concurrent with other operations. Also, many different forms of data structures could be used in various embodiments. The invention as described herein contemplates all such embodiments as may come within the scope of the following claims and equivalents thereof.

What is claimed is:

1. A packet switching device configured for processing packets, the packet switching device comprising:
a plurality of interfaces configured to receive and send packets;
one or more physical processors and physical memory configured to implement a plurality of firewalls, with each of the plurality of firewalls configured to perform firewall functionality on packets, with each firewall of the plurality of firewalls associated with a plurality of accesses; and
routing or switching or control functionality configured to control the processing and movement of packets between the plurality of interfaces and said one or more physical processors and physical memory;
wherein each interface of the plurality of interfaces is mapped to both a mapped firewall of the plurality of firewalls and an access of said accesses of the mapped firewall;
wherein said performance of said firewall functionality performed on a particular packet by a particular firewall of the plurality of firewalls is determined based on a particular entry access and a particular exit access of said accesses of the particular firewall determined based on the routing of the particular packet between the plurality of interfaces, and programming of said firewall functionality based on the particular entry access and on the particular exit access; and
wherein the packet switching device is configured to successively apply, to the particular packet, a first particular virtual firewall of the plurality of firewalls and then a second particular virtual firewall of the plurality of firewalls.

2. The packet switching device of claim 1, wherein one or more of the plurality of firewalls is a virtual firewall implemented in the packet switching device.

3. The packet switching device of claim 2, wherein each of the plurality of interfaces is a physical interface.

4. The packet switching device of claim 2, wherein said programming of said firewall functionality does not include references to the plurality of interfaces or Internet Protocol (IP) or media access control (MAC) addresses associated with the plurality of interfaces.

5. The packet switching device of claim 1, wherein one or more specific firewalls of the plurality of firewalls includes at least three accesses, and said programming of said firewall functionality of said one or more specific firewalls references said at least three accesses.

6. The packet switching device of claim 1, wherein at least two of said interfaces are mapped to a single one of said accesses of a specific firewall of the plurality of firewalls.

7. The packet switching device of claim 1, wherein the packet switching device is a router.

8. The packet switching device of claim 1, wherein said one or more mapping data structures includes a default access mapping specifying an access of said accesses to be used as default for one or more of the plurality of firewalls.

9. The packet switching device of claim 1, wherein said one or more mapping data structures is a single data structure.

10. The packet switching device of claim 1, wherein the particular firewall, the particular entry access, and the particular exit access are determined based on one or more lookup operations in one or more mapping data structures maintaining mappings between the plurality of firewalls and the plurality of interfaces, and between said accesses of the plurality of firewalls and the plurality of interfaces.

11. A packet switching device configured for processing packets, the packet switching device comprising:
a plurality of interfaces configured to receive and send packets;
one or more physical processors and physical memory configured to implement a plurality of firewalls, with each said firewall of the plurality of firewalls configured to perform firewall functionality on packets, with each firewall of the plurality of firewalls including a plurality of accesses, with each of the plurality of interfaces mapped to one of the plurality of firewalls and an access associated therewith in one or more mapping data structures maintaining mappings between the plurality of firewalls and the plurality of interfaces, and between said accesses of the plurality of firewalls and the plurality of interfaces; wherein said performance of said firewall functionality performed on a particular packet is determined based on a particular firewall of said firewalls, an entry access and an exit access of said accesses of said particular firewall, with the particular firewall and the entry access and exit access being determined based on one or more lookup operations performed on said one or more mapping data structures, and programming of the particular firewall referencing the entry access and the exit access; and
routing or switching or control functionality configured to control the processing and movement of said packets between the plurality of interfaces and said one or more physical processors and physical memory;
wherein each of the plurality of firewalls is a virtual firewall implemented in the packet switching device; and
wherein the packet switching device is configured to successively apply two of the plurality of firewalls to a particular packet.

12. The packet switching device of claim 11, wherein at least two of said firewalls are controlled by separate and independent management entities.

13. The packet switching device of claim 11, wherein each of the plurality of interfaces is a physical interface.

14. The packet switching device of claim 13, wherein said programming of said firewalls does not include references to the plurality of interfaces or Internet Protocol (IP) or media access control (MAC) addresses associated with the plurality of interfaces.

15. The packet switching device of claim 11, wherein the particular firewall includes at least three accesses, and said programming of the particular firewall references said at least three accesses.

16. The packet switching device of claim 11, wherein said one or more mapping data structures includes a default access mapping specifying an access of said accesses to be used as default for at least one of said firewalls.

17. The packet switching device of claim 11, wherein said programming of said firewalls does not include references to the plurality of interfaces or Internet Protocol (IP) or media access control (MAC) addresses associated with the plurality of interfaces.

18. The packet switching device of claim 11, wherein the packet switching device is a router.

19. The packet switching device of claim 11, wherein at least two of said interfaces are mapped to a single one of said accesses on a single one of said firewalls.

20. The packet switching device of claim 11, wherein said one or more mapping data structures is a single data structure.

21. A packet switching device configured for processing packets, the packet switching device comprising:
a plurality of interfaces configured to receive and send packets;
one or more physical processors and physical memory configured to implement a plurality of virtual firewalls, with each said virtual firewall of the plurality of virtual firewalls configured to perform firewall functionality on packets, with each virtual firewall of said virtual firewalls including a plurality of accesses, with each of the plurality of interfaces mapped to one of said virtual firewalls and an access associated therewith in one or more mapping data structures maintaining mappings between the plurality of virtual firewalls and the plurality of interfaces, and between said accesses of the plurality of virtual firewalls and the plurality of interfaces; wherein said performance of said firewall functionality performed on a particular packet is determined based on one or more of said virtual firewalls applied to the particular packet as determined from said mappings between the plurality of virtual firewalls and the plurality of interfaces said maintained in said one or more mapping data structures, and said firewall functionality applied by each particular virtual firewall of said one or more of said virtual firewalls applied to the particular packet is determined based on the corresponding entry access and exit access of said accesses of said particular virtual firewall corresponding to the particular packet as determined from said mappings between said accesses of the plurality of virtual firewalls and the plurality of interfaces said maintained in said one or more mapping data structures, and programming of the said particular virtual firewall referencing the entry access and the exit access; and
routing or switching or control functionality configured to determine and control the processing and movement of said packets between the plurality of interfaces and said virtual firewalls said implemented by said one or more physical processors and physical memory, wherein said determination for the particular packet includes performing one or more lookup operations in one or more mapping data structures to identify said one or more of said virtual firewalls and their entry and exit access thereof;
wherein the packet switching device is configured to successively apply, to the particular packet, a first particular virtual firewall of the plurality of firewalls and then a second particular virtual firewall of the plurality of firewalls.

22. The packet switching device of claim 21, wherein said programming of said virtual firewalls does not include references to the plurality of interfaces or Internet Protocol (IP) or media access control (MAC) addresses associated with the plurality of interfaces.

23. The packet switching device of claim 21, wherein at least one of said virtual firewalls includes at least three accesses and its said programming referencing said at least three accesses.

24. The packet switching device of claim 21, wherein said one or more mapping data structures includes a default access mapping specifying an access of said accesses to be used as default for the firewall.

25. The packet switching device of claim 21, wherein the packet switching device is a router.

26. The packet switching device of claim 21, wherein at least two of said interfaces are mapped to a single one of said accesses on a single one of said virtual firewalls.

27. The packet switching device of claim 21, wherein said one or more mapping data structures is a single data structure.

28. A method performed by a packet switching device, the packet switching device comprising: a plurality of interfaces and a plurality of accesses on each of a plurality of virtual firewalls; the method comprising:

maintaining one or more mapping data structures including one or more mappings from each specific interface of the plurality of interfaces to: a specific firewall of the plurality of virtual firewalls and a specific access of the specific firewall;

in response to an identification of a particular packet and an associated particular source interface of the plurality of interfaces and an associated particular destination interface of the plurality of interfaces: determining, based on one or more lookup operations in said one or more mapping data structures, a first particular virtual firewall of said virtual firewalls on which to apply to the particular packet, a first entry access of the particular virtual firewall corresponding the particular source interface and an first exit access of the first particular firewall, and determining, based on one or more lookup operations in said one or more mapping data structures, a second particular virtual firewall of said virtual firewalls on which to apply to the particular packet, a second entry access of the second particular virtual firewall and a second exit access of the second particular virtual firewall corresponding the particular destination interface; and successively applying to the particular packet in order to determine how to manipulate the particular packet: the first particular virtual firewall based on the first entry and exit accesses and then the second particular virtual firewall based on the second entry and exit accesses; and performing said manipulation on the particular packet.

29. The method of claim 28, wherein the packet switching device is a router.

30. The method of claim 28, wherein the first exit access is said determined from a default access mapping specifying an access to be used as default for the first firewall; and wherein the second entry access is said determined from a default access mapping specifying an access to be used as default for the second firewall.

31. The method of claim 28, wherein the first particular firewall is said applied to the particular packet prior to the second particular firewall.

32. The method of claim 28, wherein said one or more mapping data structures is a single data structure.

* * * * *